Figure 1:
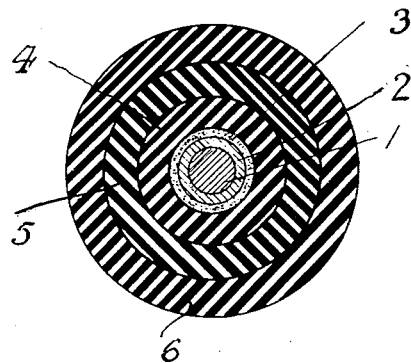

Feb. 13, 1934.   W. S. SMITH ET AL   1,947,314
CONTINUOUSLY LOADED SUBMARINE SIGNALING CABLE

Filed March 28, 1931

INVENTORS.
W. S. Smith,
H. J. Garnett and
J. N. Dean,
by Baldwin & Wight
ATTORNEYS.

Patented Feb. 13, 1934

1,947,314

UNITED STATES PATENT OFFICE

1,947,314

CONTINUOUSLY LOADED SUBMARINE SIGNALING CABLE

Willoughby Statham Smith, Benchams, Newton Poppleford, Henry Joseph Garnett, Sevenoaks, and John Norman Dean, Orpington, England Application March 28, 1931, Serial No. 526,114, and in Great Britain April 11, 1930

7 Claims. (Cl. 178—45)

In the copending application of Smith, Garnett and Channon, Serial No. 303,970, filed September 4, 1928, now Patent No. 1,819,720, granted Aug. 18, 1931, there is described a loaded signaling cable in which the loading material before the application of the insulating is surrounded with a cushion of petroleum jelly or like viscous paraffin hydrocarbon, thickened with the addition of a medium such as rubber, gutta percha, balata or the like.

It has been found that, even at sea bottom temperatures, many organic dielectrics absorb over long periods of time, appreciable quantities of the paraffin hydrocarbons used in the preparation of the above mentioned pressure equalizing mediums. For example, rubber and certain rubber-bitumen mixtures swell when placed in contact with petroleum jelly. Thus, when a continuously loaded signaling conductor is surrounded with a layer of a pressure equalizing medium comprising petroleum jelly, and is then insulated with a rubber containing composition, the insulation will, owing to the presence of the rubber, gradually absorb the petroleum jelly from the pressure equalizing medium, whereby the valuable properties of the latter are impaired.

According to the present invention, in a continuously loaded submarine signaling cable having a pressure equalizing medium surrounding the loading material and an outer layer of insulation, for which said medium has an affinity or vice versa, there is provided a layer of insulation intermediate said medium and the outer insulation, and which does not react with the latter.

A continuously loaded submarine signaling cable having a pressure equalizing medium comprising a paraffin hydrocarbon such as petroleum jelly, may be provided with a layer of gutta percha and/or balata, which are materials not affected by the paraffin hydrocarbon, intermediate said medium and the outer insulation which may be of rubber or rubber material. Preferably the gutta percha and/or balata is treated so as to remove the whole or part of the resins and/or dirt.

Preferably, however, the intermediate layer consists of a mixture of dirt and resin free gutta percha and petroleum jelly described in our co-pending application No. 499,406. It has found that under the working conditions of the cable, the slight tendency of gutta percha to absorb petroleum jelly is reduced to insignificant proportions by the presence of a certain amount of that substance or a similar body or a homologue in the gutta percha.

Moreover, when the interposed layer consists of the gutta percha petroleum jelly mixture, the electrical properties of this layer are intermediate between those of the petroleum jelly-pressure equalizing medium next the conductor and the outer layers of the insulation. This grading of the electrical properties is of advantage in causing a smooth potential gradient over the whole section of the dielectric.

According to a further feature of the invention a continuously loaded submarine cable having a pressure equalizing medium surrounding the loading material is provided with a plurality of layers of insulation, the specific inductive capacity of which layers decrease from the outer to the inner layer whereby a smooth potential gradient is obtained.

Figure 2:
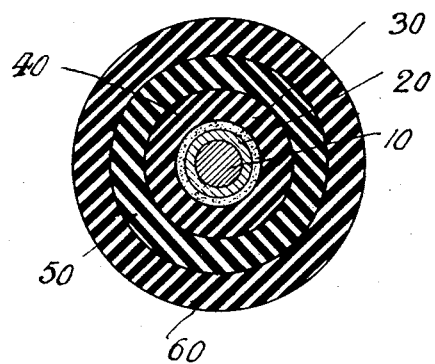

The invention is illustrated in the accompanying drawing in which Figures 1 and 2 are diagrammatic cross sectional views of cores made in accordance with the invention.

In Figure 1:—
1 represents a copper conductor.
2 represents loading material.
3 represents petroleum jelly pressure equalizing medium.
4 represents a protective layer of dirt and resin-free gutta percha or of deresinated balata.
5 and 6 represent layers of a mixture of rubber-bitumen plus dirt and resin-free gutta percha.

In Figure 2:—
10 represents a copper conductor.
20 represents loading material.
30 represents petroleum jelly pressure equalizing medium.
40 represents a layer of 60% dirt and resin-free gutta percha plus 40% petroleum jelly.
50 represents a layer of 80% dirt and resin-free gutta percha plus 20% petroleum jelly.
60 represents a layer of dirt and resin-free gutta percha.

In another case
40 represents a layer of 60% deresinated balata plus 40% petroleum jelly.
50 represents a layer of 80% deresinated balata plus 20% petroleum jelly.
60 represents a layer of 50% rubber bitumen mixture plus 50% dirt and resin-free gutta percha.

When an intermediate layer consisting of a mixture of gutta percha with petroleum jelly is employed, a mixture containing up to about 30% of petroleum jelly will be found suitable. Mixtures containing 50% or even higher amounts may however, be employed since the mixtures when subjected to a heat treatment in the manner described in the copending application of Smith, Garnett, and Dean, Serial No. 413,398, filed December 11, 1929 are rendered sufficiently stable although their use is limited by their softness.

In the accompanying claims the term gutta percha is to be read to include balata or the like.

What we claim is:—

1. In a continuously loaded submarine signaling cable having a pressure equalizing medium surrounding the loading material, an outer layer of insulation for which the pressure equalizing medium has an affinity or vice versa, and an intermediate layer of insulation which does not react with the outer insulation disposed between and separating the pressure equalizing medium from the layer of insulation, said intermediate layer comprising a mixture of the material of the outer insulation and the material of the pressure equalizing medium.

2. In a continuously loaded submarine signaling cable the combination of a conductor, a layer of loading material continuously applied to said conductor, a pressure equalizing medium comprising a paraffin hydrocarbon surrounding the loading material, an outer layer of insulation comprising rubber having an affinity for paraffin hydrocarbon and an intermediate layer of gutta percha separating said medium from the outer layer of insulation.

3. The combination claimed in claim 2 comprising an intermediate layer of gutta percha from which the dirt has been removed.

4. The combination claimed in claim 2 comprising an intermediate layer of gutta percha from which the dirt and resin have been removed.

5. The combination claimed in claim 2 comprising an intermediate layer consisting of a mixture of dirt and resin free gutta percha with a semi-solid refined petroleum product.

6. In a continuously loaded submarine signaling cable the combination of a conductor, a layer of loading material applied continuously to the conductor, a pressure equalizing medium containing paraffin hydrocarbon surrounding the loading material, and insulation comprising layers of dirt and resin free gutta percha incorporated with a semi-solid refined petroleum product the content of which in each successive layer decreases progressively with the distance of the layer from the conductor.

7. In a continuously loaded submarine signaling cable, the combination of a conductor, a layer of loading material continuously applied to said conductor, a pressure equalizing medium comprising a paraffin hydrocarbon surrounding the loading material, an outer layer of insulation such as rubber having an affinity for paraffin hydrocarbon, and an intermediate layer of insulation which does not readily absorb the hydrocarbon disposed between and separating said medium from the outer layer of insulation, said intermediate layer comprising material whose dielectric properties are not appreciably inferior to those of the outer layer.

WILLOUGHBY STATHAM SMITH.
HENRY JOSEPH GARNETT.
JOHN NORMAN DEAN.